United States Patent [19]

Negus

[11] Patent Number: 5,046,070
[45] Date of Patent: Sep. 3, 1991

[54] LONGITUDINALLY LASER PUMPED LASER WITH COMPENSATION FOR THERMAL LENS EFFECTS

[75] Inventor: Daniel K. Negus, La Honda, Calif.

[73] Assignee: Coherent, Inc., Palo Alto, Calif.

[21] Appl. No.: 527,013

[22] Filed: May 22, 1990

[51] Int. Cl.$^5$ .............................................. H01S 3/00
[52] U.S. Cl. .................................... 372/33; 372/101; 372/69
[58] Field of Search ..................... 372/101, 33, 34, 92, 372/69

[56] References Cited

U.S. PATENT DOCUMENTS 3,702,974  11/1972  Koechner et al. ..................... 372/33
4,894,831  1/1990  Alfrey .................................... 372/19

OTHER PUBLICATIONS

P. A. Schultz, "Single-Frequency Ti:Al$_2$O$_3$ Ring Laser", IEEE Journal of Quantum Electronics, vol. 24, No. 6, Jun. 1988.
P. A. Schultz, "Single-Frequency Ti:Al$_2$O$_3$ Ring Laser", CLEO Conference, Apr. 1987.
P. F. Moulton, "An Investigation of the Co:MgF$_2$ Laser System", IEEE Journal of Quantum Electronics, vol. QE-21, No. 10, Oct. 1985, pp. 1582-1595.
P. F. Moulton, "Spectroscopic and Laser Characteristics of Ti:Al$_2$O$_3$", J. Optical Society of America, vol. 3, No. 1, Jan. 1986.
Rines et al, "Pulsed Ti:Al$_2$O$_3$ Ring Laser", CLEO Conference, Apr. 1987.
Sanchez et al, "Room-Temperature cw Operation of the Ti:Al$_2$O$_3$ Laser", Jun. 4-6, 1986, OSA Topical Meeting, pp. 202-207.
A. Sanchez, "Crystal Growth, Spectroscopy, and Laser Characteristics of Ti:Al$_2$O$_3$", IEEE Journal of Quantum Electronics, vol. 24, No. 6, Jun. 1988, pp. 995-1002.
Kogelnik, Applied Optics, vol. 5, pp. 1550-1567 (1966).
A. Siegman, *Lasers*, University Science Books, Mill Valley, CA (1986).
Koechner, "Thermal Effects in Laser Rods", Solid State Laser Engineering, Springer-Verlag, N.Y., pp. 350-381 (1988).
Hu et al, "New Thermooptical Measurement Method and a Comparison with Other Methods", Applied Optics, vol. 12, No. 1, Jan. 1973, pp. 72-79.
Kogelnik et al, "Astigmatically Compensated Cavities for CW Dye Lasers", IEEE Journal of Quantum Electronics, vol. QE-8, No. 3, Mar. 1972, pp. 373-379.

Primary Examiner—Léon Scott, Jr.
Attorney, Agent, or Firm—Limbach, Limbach & Sutton

[57] ABSTRACT

A laser system is disclosed wherein a solid state gain medium (30) is longitudinally pumped with the beam (40) from another laser (42). The laser is configured with an optically stable resonator while at the same time matching the shape of the pump beam to the shape of the cavity beam in the gain medium. Optimum matching is achieved by taking into consideration thermal lens effects in the gain medium resulting from absorption of the pump beam.

4 Claims, 8 Drawing Sheets

LONGITUDINALLY LASER PUMPED LASER WITH COMPENSATION FOR THERMAL LENS EFFECTS

TECHNICAL FIELD

The subject invention relates to a laser system wherein a solid state gain medium is longitudinally pumped with the beam from another laser. Efficiency is maximized by matching the shape of pump beam to the shape of the cavity beam in the gain medium while maintaining an optically stable resonator. Optimum matching is achieved by taking into consideration thermal lens effects in the gain medium resulting from absorption of the pump beam.

BACKGROUND OF THE INVENTION

Recently, there has been considerable effort devoted to developing tunable solid state lasers excited by a pump beam from another laser. One system which is finding commercial acceptance includes a gain medium formed from titanium:sapphire and is pumped by a beam from an argon laser. Unlike tunable dye lasers which are typically pumped in a non-collinear fashion, these newer lasers must be longitudinally pumped in order to maximize the transfer of energy from the pump beam to the resonant cavity beam.

When a gain medium is longitudinally pumped, the medium is generally provided with Brewster angle cut interfaces to minimize transmission losses. This configuration creates a certain amount of astigmatism in the cavity. Astigmatism is also created because the gain medium is typically located at a segment of the resonant cavity between two off-axis focusing mirrors. Good laser cavity design can be used to minimize the effects of astigmatism on the cavity beam. Good laser design is also important to maximize the overlap between the pump and cavity beams for efficient energy transfer.

The problem of compensating for the astigmatism of the pump beam has been addressed by others. For example, a compensated laser design is described in "Single-Frequency Ti:Al$_2$O$_3$ Ring Laser," by Peter A. Schulz, IEEE Journal of Quantum Electronics, Vol. 24, No. 6, June 1988. In this article, an argon laser beam is used to longitudinally pump a Brewster cut, titanium:sapphire solid state gain medium. The argon laser beam is focused into the gain medium by a lens. The astigmatism of the pump beam is adjusted to form a best average match with the astigmatic resonator beam by tilting the lens about its vertical axis.

This problem was also addressed in U.S. Pat. No. 4,894,831, issued Jan. 16, 1990, to Alfrey. In the laser design set forth in this patent, the pump beam is directed into the gain medium by an off-axis concave mirror. The astigmatism of the pump beam is adjusted by tilting the mirror in a manner exactly analogous to the tilting of the lens in the Schulz reference.

In both the Schulz reference and the Alfrey patent, the determination of the tilt angle of the focusing optic was based upon the astigmatism introduced by the specific geometry of the optical elements in the cavity. No consideration was given to thermal lens effects that are created in the solid state gain medium as a result of the absorption of the energy from the pump beam. A thermal lens in the gain medium will act as another focusing element which should be taken into account in order to optimize the match between the cavity beam and the pump beam in the gain medium. This factor becomes increasingly significant as the power level of the pump laser increases. As will be discussed below, the optimum tilt angle of the focusing optic can be significantly different when thermal lens effects are considered.

In the prior art, thermal lens effects in various solid state gain mediums has been addressed. However, this prior work has typically been limited to heavily arc or flashlamp pumped lasers where the thermal lens effects are constant along the length of the gain medium. In contrast, in a longitudinally pumped gain medium, the focal power of the thermal lens varies along its length since the pump light is exponentially attenuated as a function of the distance along the gain medium. In order to determine the proper astigmatism of the optic focusing the pump beam, this variation in the focal power of the thermal lens in the gain medium must be considered. In practice, the thermal lens effects in the gain medium will tend to be astigmatic and this factor must also be considered.

Accordingly, it is an object of the subject invention to provide a new and improved longitudinally laser pumped solid state laser.

It is a further object of the subject invention to provide a longitudinally pumped laser wherein the thermal lens effects induced in the gain medium by the pump beam are taken into consideration to achieve an optimum overlap of the pump and cavity beams.

It is another object of the subject invention to provide a longitudinally pumped laser system wherein the tilt angle of the optic used to focus the pump beam into the gain medium is selected to compensate for thermal lens effects in the gain medium.

It is still a further object of the subject invention to provide a longitudinally pumped laser system wherein thermal lens effects are considered to permit pumping with higher powers while still maintaining a stable optical resonator thus achieving higher output power.

SUMMARY OF THE INVENTION

In accordance with these and other objects, the subject invention provides for a longitudinally pumped laser system. The laser includes a solid state gain medium located within a resonant cavity. The gain medium is preferably located in a focusing arm in the cavity between two off-axis mirrors. The end surfaces of the gain medium are provided with Brewster angle interfaces for minimizing transmission losses. This configuration will create a certain level of astigmatism in the cavity beam. In the illustrated embodiment, the gain medium is formed from Titanium:Sapphire.

The gain medium is pumped with a beam from a pump laser. The beam is focused by a lens through one of the off-axis mirrors in the resonant cavity so that the crystal is longitudinally pumped. As discussed in greater detail below, the absorption of the pump beam energy will create thermal lens effects in the gain medium which affect both the pump and cavity beams. In accordance with the subject invention, these thermal lens effects along with other astigmatic effects of the geometry of the optical elements in the cavity, are considered in the design of the system. In the illustrated embodiment, these effects are addressed by properly setting the astigmatism of the focusing lens. When the astigmatism is properly set (through the focal length, position and tilt angle of the focusing lens), the best overlap of the cavity and pump beams can be achieved. As will be seen, the preferred tilt angle can be significantly different from the tilt angle suggested by the prior art references cited above.

Further objects and advantages will become apparent from the following detailed description, taken in conjunction with the drawings in which:

DETAILED DESCRIPTION OF THE PREFERRED EMBODIMENT

Resonator Analysis

The coherent radiation propagating from optical laser oscillators usually appears as a well collimated beam whose diameter is large compared to the oscillating wavelength. The coherence properties of this beam arise primarily from the classical resonant cavity properties of the laser resonator and stimulated emission. An optical resonator possesses a lowest order transverse mode which can circulate repeatedly around the laser cavity and return to any reference point without changing its amplitude or its phase profile. The properties of a beam resonating inside the optical structure, its free space propagation, its size at various positions in the structure, and its interaction with various optical elements have been studied extensively. These properties can be very sensitive to even weak thermal focussing introduced by laser pumping the gain medium of the longitudinally pumped laser.

Conventional analysis of a resonator is accomplished by assuming that each optical element of the cavity can be represented by generalized complex elements whose paraxial properties can be completely described by a matrix. The analysis proceeds by choosing a reference plane within the resonator structure (e.g. at an output coupler) and evaluating the product of all the matrices describing a resonator round trip beginning from this reference plane through all the individual cavity elements and back again. (For the case of a ring laser, the beam is propagated only once through the elements). A mathematical analysis is performed to determine if there exists a complex beam whose parameters are self-consistent after a round trip through all of these elements. If such a solution exists, then the cavity is optically stable. This method of evaluation is referred to as the ABCD matrix method.

A practical multielement stable laser often contains a number of lenses, curved and off-axis mirrors, ducts, Brewster plates, a gain medium and so on. The stable gaussian mode in these multielement cavities is analyzed by multiplying ABCD matrices of different elements sequentially and solving for their confined and perturbation stable gaussian eigenwaves. When the resonator contains elements which break the symmetry between two orthogonal axes (e.g. an off-axis reflective mirror or other astigmatic element) then the calculations must be conducted for both planes to ensure that proper compensation of these symmetry breaking elements results in stable behavior for both axes over some range of resonator parameters.

A cause of resonator instability (as defined above) in solid-state lasers can be weak thermal focusing that occurs in the solid state laser medium when it is heavily pumped. The combination of temperature rise and thermal expansion within the gain medium produces an index increase due both to the thermal variation of the index of refraction and to thermally induced stress-optic effects. The gain medium then acts as an index duct with a characteristic focal length. In the case of a longitudinally laser pumped laser however, it is not sufficient to treat the gain medium simply as an index duct. In this case the details of thermal self focusing within the gain material as the pump beam is absorbed and propagates must be considered in order to calculate the optimum overlap between the pumping laser beam and the cavity beam of the pumped laser.

As noted above, in the prior art, the problems associated with thermal focusing in solid state laser rods which were heavily arc or flashlamp pumped were considered. However, these studies did not address the problem of thermal lensing caused by laser pumping. In the case of lamp pumping, the power of the thermal lens is nearly constant along the length of the laser medium. In contrast, in the case of laser pumping, the thermal lens is not constant along the length of the gain medium because the pump light is being exponentially attenuated as a function of distance into the gain medium. This has the effect of creating a thermal lens whose focal power per unit length is exponentially dependent upon the distance to the input surface of the gain material.

An additional aspect of the laser pumped laser problem involves the fact that, in general, the thermal lens that is created will be astigmatic (being described by two distinctly different focal lengths in two orthogonal planes). In order to optimize the output power and other performance characteristics of the laser pumped laser, these two different focal length lenses must be treated explicitly in the resonator stability calculation.

Calculating the Thermal Lens

It has been shown that when a cw laser beam is passed through a homogeneous absorbing medium at time $t=0$, an effective lens begins to develop in the medium according to $$1/f = P_{ab} (dn/dT) / \pi k \omega^2 (1 - t_c/2t) \quad (1)$$

where f is the focal length of the thermal lens. $P_{abs}$ is the power absorbed by the material, dn/dT is the thermo-optic coefficient, k is the thermal conductivity of the medium, ω is the pumping beam radius, and $$t_c = \omega^2 \rho c / 4 k. \quad (2)$$

where ρ is the density and c is the specific heat. At thermal equilibrium (large time t), equation (1) reduces to $$1/f = P_{abs} (dn/dT)/\pi k \omega^2. \quad (3)$$

The analysis that resulted in equation (1) assumes that conduction is the dominant mechanism of heat dissipation. If the pumped material is a solid, then one need not consider convection. Additionally, then the power absorbed by the gain medium is given by $$P_{abs} = P_{inc} \alpha L \quad (4)$$

where $P_{inc}$ is the power incident upon the gain medium, α is the absorption coefficient of the material, and L is the length of the gain medium.

In a laser pumped laser oscillator there is also one other important mechanism which can contribute substantially to heat dissipation, namely, laser cooling by efficient extraction of energy from the gain material by stimulated emission (lasing of the pumped laser). In this case the absorbed power in equation (3) must be replaced by the quantity of power that must be dissipated by conduction as heat which given by $$P_{con} = P_{abs} - P_{out} \quad (5)$$

where $P_{abs}$ is the power absorbed by the gain material and $P_{out}$ is the power extracted from the pumped laser while it is lasing. The equation for the focal power f' of the thermal lens inside the lasing pumped oscillator then becomes $$1/f' = P_{con} (dn/dT)/\pi k \omega^2. \quad (6)$$

In general, the focal power of this lens does not have to be spherically symmetric but can be astigmatic in nature. There are several sources of astigmatism for this duct.

The first source of astigmatism results from the geometry of the pump beam. If the pump beam inside the gain medium is not round and $\omega_x$ is not equal to $\omega_y$ then $f_x$ does not equal $f_y$. There can be many reasons why a pump beam is not cylindrically symmetric inside the gain material. One of the most common reasons results from the fact that when a circular beam propagates into a dielectric material at an angle (e.g. Brewster's angle) the beam diameter is expanded in the plane of incidence but is exactly the same in the plane perpendicular to the incident plane. If the angle of incidence is equal to Brewster's angle the beam diameter will be enlarged by a factor of the index of refraction n, in the incident plane. This immediately results in a thermal lens which is $n^2$ less powerful in the incident plane. This has a dramatic effect on the stability of the resonator and must be explicitly included.

It is usually desirable to have the output of the laser pumped oscillator be fully compensated for astigmatism at its output. In the case where this laser contains a gain medium cut at the Brewster angle this design requirement implies that the resonator beam inside the gain medium will not be round. In order to achieve optimal overlap between the pumping beam and the pumped cavity beam it will in general be necessary to have the pumping beam be somewhat astigmatic. If the resulting astigmatic thermal lens is not properly considered then the understanding of the pump beam and the pumped resonator beam characteristics will be wrong and any precalculation of preset angles on pump beam astigmatic optimization optics will also be wrong and will not result in the highest output power or other optimum performance characteristics.

Other sources of astigmatism in the thermal lens are related to properties of the gain material itself as well as to the details of the conductive heat transport. It is sometimes the case that the gain material of the pumped laser is crystalline and therefore potentially anisotropic with respect to the parameters dn/dT and k. In this case equation (6) becomes $$1/f_x' = P_{con} (dn/dT)_x / \pi k_x \omega_x^2$$

$$1/f_y' = P_{con} (dn/dT)_y / \pi k_y \omega_y^2 \quad (7)$$

To understand the detailed properties of the astigmatic thermal lens as a function of distance into the gain medium, the gain medium can be modelled as a series of sequential ducts whose focal length per unit length is diminishing as the pump beam is absorbed as it propagates.

Demonstration of the Technique

As an example of the calculation technique and a demonstration of the importance of explicitly including the thermal lensing behavior we consider a Brewster cut titanium sapphire gain medium. An example of such a crystal 30 is shown in the laser illustrated in FIG. 5 and discussed in greater detail below.

Figure 1:
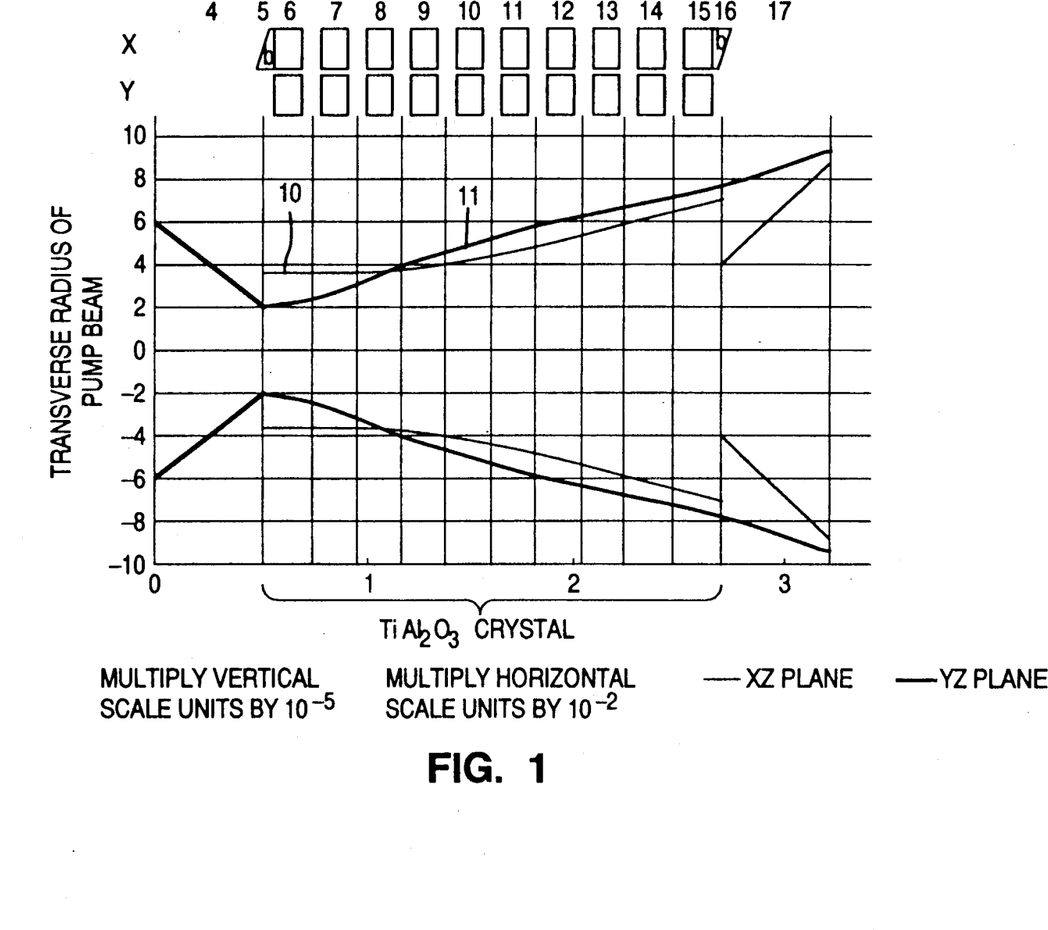
FIG. 1 is a graph illustrating a comparison of the transverse radii in the XZ and YZ planes of an initially round beam passing through a Brewster cut crystal taking into account the astigmatic thermal lens effects with a pump beam of 8 Watts.

FIG. 1 shows the transverse radius of an initially round beam being propagated into this crystal in the case where the astigmatic thermal lens effects have been included and where the pumping power corresponds to $P_{con} = 8$ W. In this example a round gaussian profile beam is being focussed to a waist radius of 20 microns in air in both the XZ and the YZ plane at the input face of the crystal. The XZ plane defines the incident plane. Curve 10 shows the radius in the XZ plane while curve 11 shows the radius in the YZ plane. As can be seen from the difference between these curves, the astigmatic thermal lens has a significant effect even for this relatively low pump power. For example, the beam diameter immediately after propagation into the Brewster angled structure element labeled #5 shows a n = 1.76 expansion. This results in an XZ thermal lens with less focussing power than that created in the YZ plane. The focusing power at various points throughout the crystal is shown in Table I below.

TABLE I

| Structural Element # | Focal Length per meter XZ plane | Structural Element # | Focal Length per meter YZ plane |
|---|---|---|---|
| 6 | 5.772923E-5 | 6 | 2.04043E-5 |
| 7 | 8.698147E-5 | 7 | 2.846989E-5 |
| 8 | 1.517346E-4 | 8 | 4.213499E-5 |
| 9 | 2.580099E-4 | 9 | 5.974254E-5 |
| 10 | 4.242847E-4 | 10 | 8.566156E-5 |
| 11 | 6.801449E-4 | 11 | 1.28986E-4 |
| 12 | 1.067086E-3 | 12 | 2.001838E-4 |
| 13 | 1.641681E-3 | 13 | 3.103949E-4 |
| 14 | 2.480507E-3 | 14 | 4.733599E-4 |

TABLE I-continued

| Structural Element # | Focal Length per meter XZ plane | Structural Element # | Focal Length per meter YZ plane |
| --- | --- | --- | --- |
| 15 | 3.686839E-3 | 15 | 7.074758E-4 |

As can be seen, as the pump beam propagates through the crystal, its power is diminished along the propagation axis z according to the Beer-Lambert absorption law.

$$P(z) = P_{inc} \exp(-\alpha Z) \quad (8)$$

where $z=0$ corresponds the input face of the crystal. In the example shown each duct element of Table I (structures 6→15) is 2.2 mm long and $\alpha = 0.89$ cm$^{-1}$. In this case the power incident upon the second duct element (structure #7) is $(0.82)P_{inc}$ and thus the power of the thermal lens created will decrease as a function of distance into the crystal. In the case shown here the lens created has a focussing effect upon the propagating pump beam. At the output face of the titanium sapphire crystal (after structure #16) the transverse radius of the pumping beam is equal to 40 microns in the XZ plane and 75 microns in the YZ plane.

Figure 2:
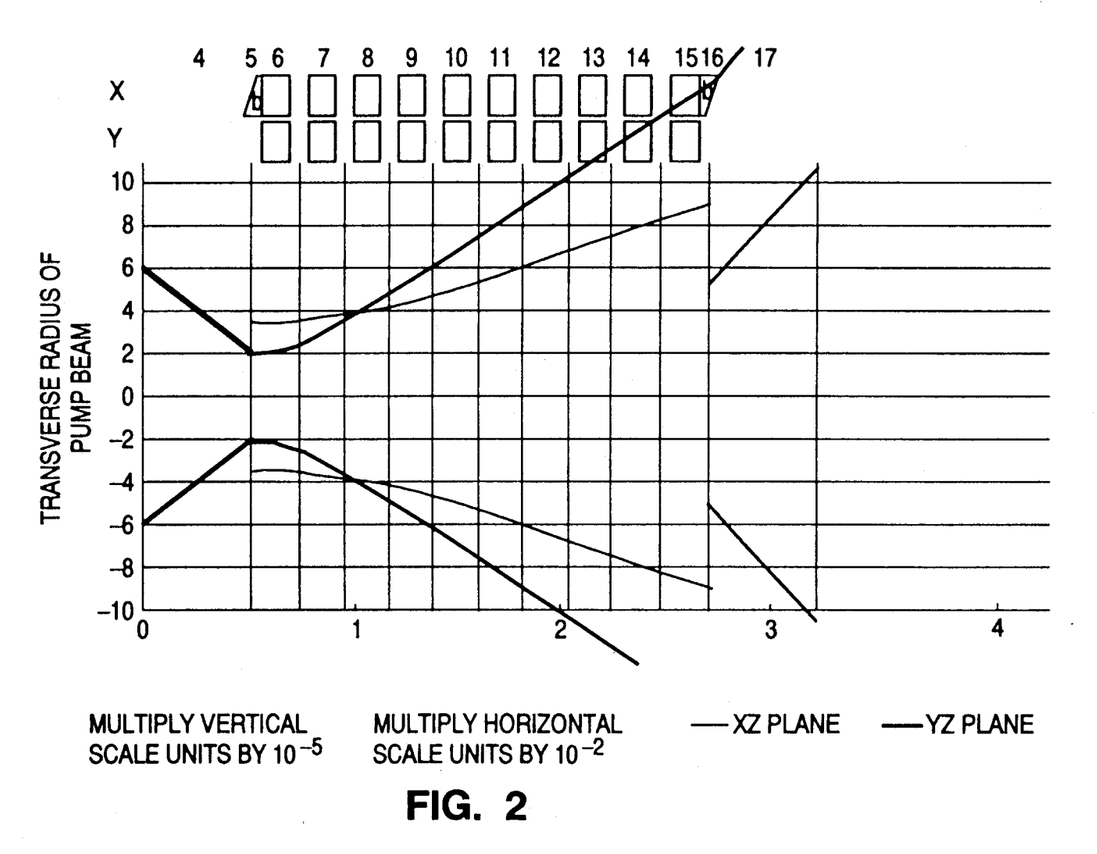
FIG. 2 is a graph, similar to FIG. 1, illustrating the expected transverse radii if the astigmatic thermal lens effects were not considered.

This difference in beam radius can be compared to the difference that would be calculated where the same input beam conditions are assumed but where thermal focussing is not taken into consideration as taught by the prior art. FIG. 2 illustrates such a calculation. As can be seen, the transverse radii of the pumping beam just after exit into air from the gain medium (structure #16) are 53 microns in the XZ plane and 150 microns in the YZ plane (2 times the value in the thermal lens case shown in FIG. 1).

Figure 3:
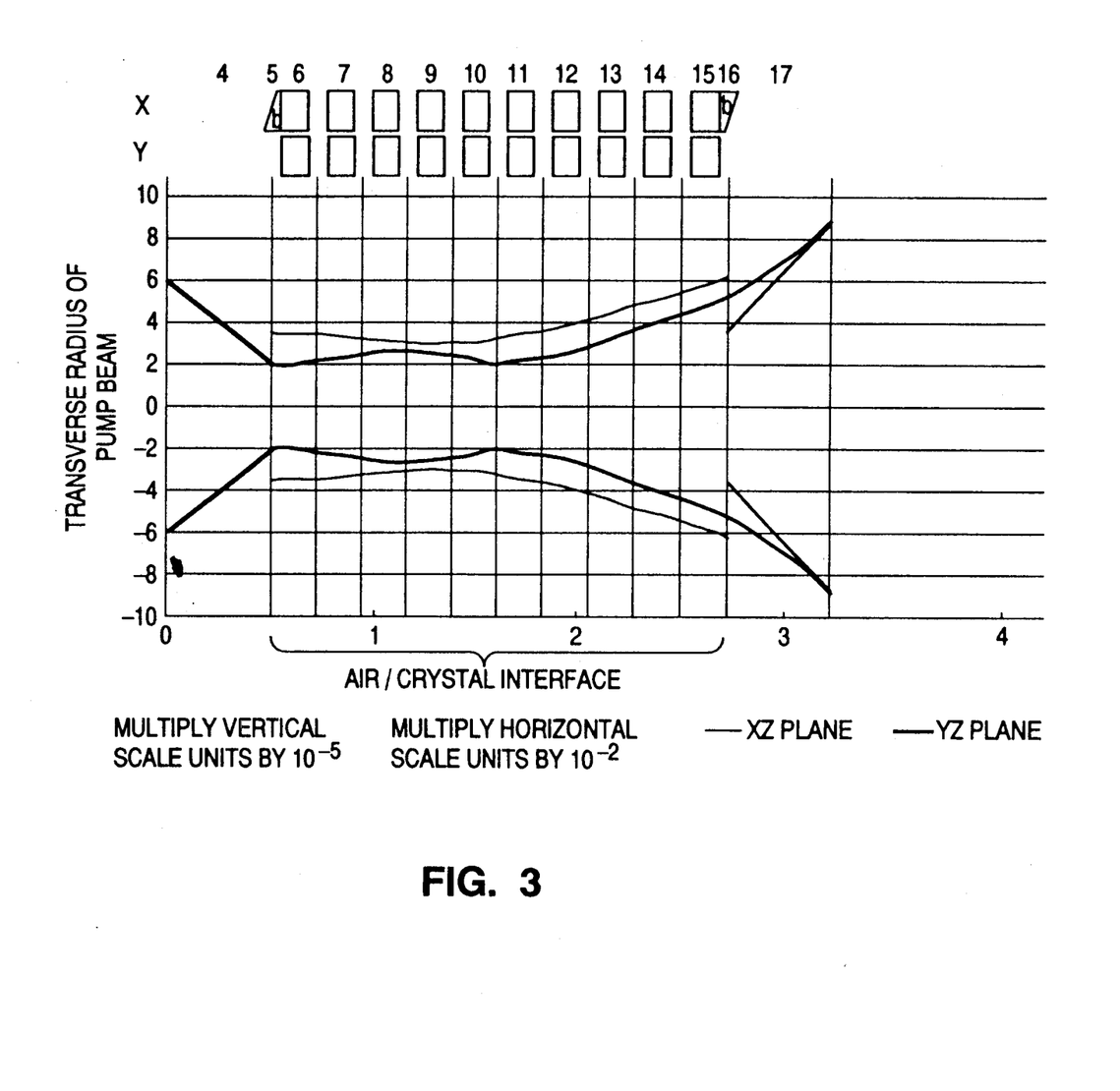
FIG. 3 is a graph similar to FIG. 1 wherein the astigmatic thermal lens effects of a 20 Watt pump beam are considered.

FIG. 3 shows the magnitude of the thermal lensing effect for the high power pumping case where $P_{con} = 20$ W. Table II shows the focusing power at various points through the crystal.

TABLE II

| Structural Element # | Focal Length per meter XZ Plane | Structural Element # | Focal Length per meter YZ Plane |
| --- | --- | --- | --- |
| 6 | 2.31293E-5 | 6 | 8.161719E-6 |
| 7 | 3.273109E-5 | 7 | 9.465633E-6 |
| 8 | 4.999246E-5 | 8 | 8.738052E-6 |
| 9 | 7.348122E-5 | 9 | 8.869332E-6 |
| 10 | 1.078418E-4 | 10 | 1.595145E-5 |
| 11 | 1.627099E-4 | 11 | 2.499712E-5 |
| 12 | 2.504277E-4 | 12 | 4.020553E-5 |
| 13 | 3.855098E-4 | 13 | 6.733616E-5 |
| 14 | 5.861823E-4 | 14 | 1.088569E-4 |
| 15 | 8.765652E-4 | 15 | 1.672289E-4 |

In this case it can be seen that the thermally induced lens is very strongly focussing even to the extent of creating a second beam waist in both planes some distance into the gain medium. Again the output beam parameters can be compared to the non-lensing case of FIG. 2. In the XZ plane the transverse radius is only 37 microns at structure #16 (compared to 53 of FIG. 2) and 50 microns in the YZ plane (compared to 150 of FIG. 2).

Measurement of $f_x'$ and $f_y'$

As discussed above, the detailed nature of the propagation of the pump beam inside the gain material can be understood with a knowledge of $f_x'$ and $f_y'$ as a function of position in the gain material. In principle, the focal power created by the gain medium can be calculated directly from equation (7). In practice the factors $(dn/dT)_x$, $k_x$, $(dn/dT)_y$ and $k_y$ are not known to a high enough degree and must be measured before the calculation of resonator properties can proceed.

One technique to accomplish this is to measure the bulk focussing properties of a known length of pumped gain material. If the beam propagation parameters of the pumping beam are known to sufficient accuracy then the lensing power in the 2 orthogonol planes XZ and YZ can be obtained by measurement of the pump beam parameters after propagation through the gain material. Knowing exactly how the pumping beam is transformed by the focussing duct as a function of pumping power allows an accurate determination of the ratio of the reduced parameters $R_x$ and $R_y$ given by $$R_x = (dn/dt)_x/k_x$$

$$R_y = (dn/dT)_y/k_y. \quad (9)$$

Figure 4:
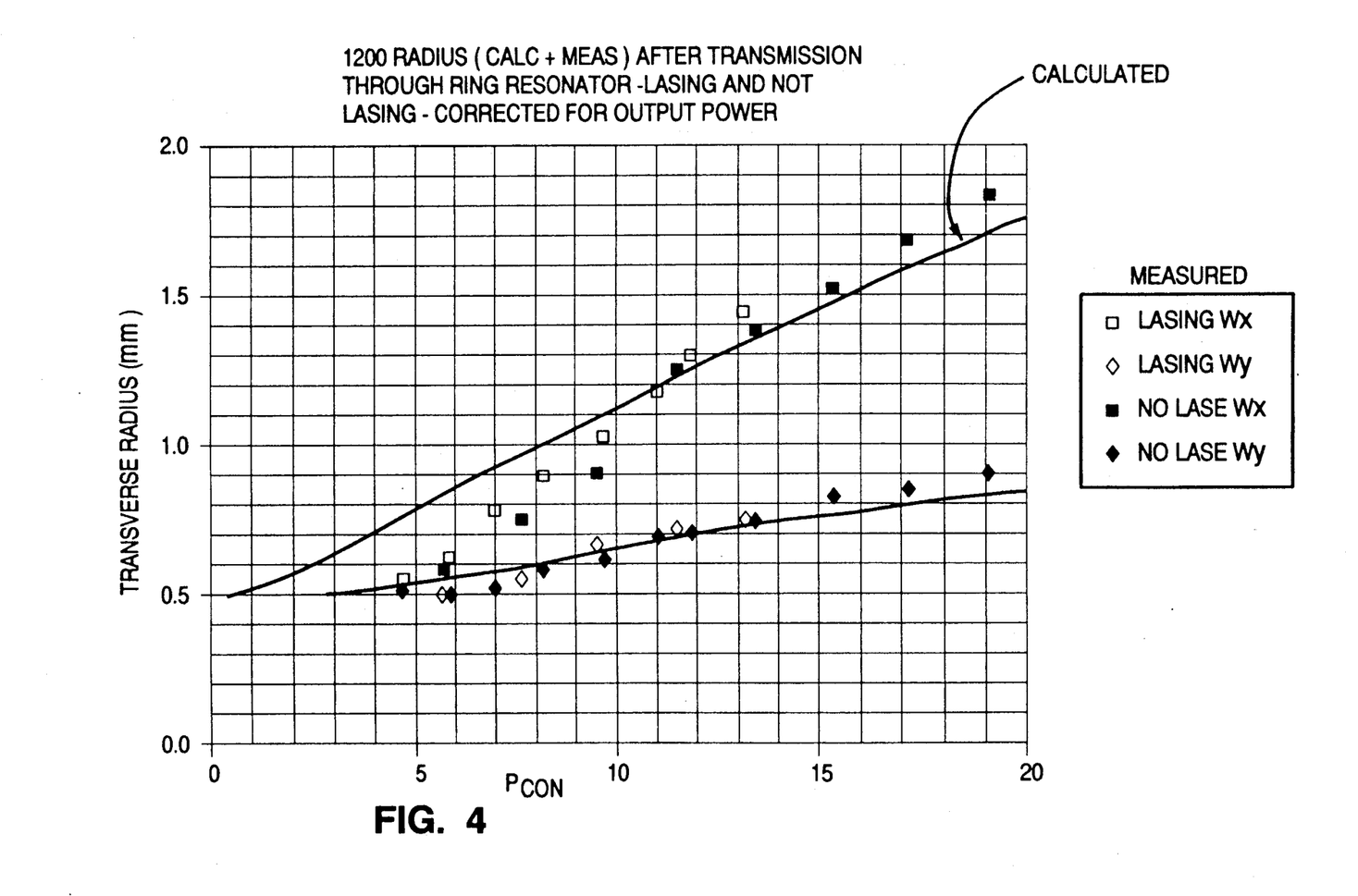
FIG. 4 is a graph of the transverse radius, in two planes, of a pump beam after transmission through a gain crystal, and comparing the lasing and non-lasing condition.

From these values of R, $f_x'$ and $f_y'$ can be determined using equation (7). FIG. 4 shows an experimental measurement of the transverse radius of an ion laser pump beam at some distance d after the titanium sapphire crystal contained within a laser pumped laser oscillator.

These curves demonstrate several important points as well as provide a measurement of $R_x$ and $R_y$. The experimental points labeled no lase $W_x$ and no lase $W_y$ are the values of the transverse radius of the transmitted pump laser beam in the XZ and YZ plane respectively, at a well defined measurement point after the crystal. In this case $P_{out}=0$ and from equation (4) $P_{con}=P_{abs}$. The experimental points labeled lasing $W_x$ and lasing $W_y$ are the values of the transverse radius of the transmitted pump laser beam in the XZ and YZ plane in the case where the laser pumped laser oscillator is operating at high efficiency and high average output power. In this case it is necessary to include the effects of stimulated emission (as described above) and subtract the laser output power from the power absorbed in order to calculate the corrected thermal focussing power (i.e., $P_{con} = P_{abs} - P_{out}$).

For the experimental points labeled lasing, the highest pump power shown here corresponds to a ti:sapphire laser output power ($P_{out}$) of 6.1 watts. This output was achieved for an incident power ($P_{inc}$) of 19.1 watts. In order to compare the values of the measured beam radii under lasing and non-lasing conditions, the radii are plotted versus the conducted power $P_{con}$ ($P_{abs} - P_{out}$). When the radii are plotted in this manner, it can been seen that $P_{con}$ is the relevant power for determining the focal power of the thermal lens since this causes the measured values of the radii under lasing and non-lasing conditions to superimpose. If this laser cooling by stimulated emission effect were not included, and the focal power of the thermal lens was simply calculated from $P_{abs}$ (as taught by the prior art) then the focal power of the lens calculated would be in error by over 30 percent. This percentage of error is based on the fact that a value of 19.1 watts would have been inserted into equation 3 rather than the proper value of 13.0 watts ($P_{con} = P_{abs} - P_{out} = 19.1 - 6.1$) as shown in equation 6.

These data shown in FIG. 4 also clearly demonstrate the power level at which the thermal lens becomes important for the beam parameters and crystal material employed here. The transverse radius when the power equals zero in this case is 0.5 mm for both the XZ and the YZ plane. At pump powers corresponding to $P_{con}$ greater than approximately 4 W the transmitted pump laser beam begins to increase rapidly in size as $P_{con}$ is increased indicating the presence of a strong thermal lens.

The smooth curves drawn through the experimental data points shown in FIG. 4 are the calculated best fit values of the transverse pump beam radius at this measurement point using the calculational technique described above. From this fit the values of $R_x$ and $R_y$ are determined and for the example given here are $$R_x = 2.17 \times 10^{-6} m \cdot W^{-1}$$

and $$R_y = 7.79 \times 10^{-7} m \cdot W^{-1}$$

In this case the titanium sapphire crystal is carefully oriented with the c axis in the plane of incidence and parallel to the electric vector describing the polarization of the beam propagating along Z inside the crystal. Additionally, the crystal is uniformly cooled (cylindrically with respect to the propagation axis). This may be important in order that the astigmatism introduced into the thermal lens as indicated by these differing values of $R_x$ and $R_y$ be minimized.

The extent to which $R_x$ and $R_y$ differ represents an astigmatism which must be partially compensated by adjustment of astigmatism in the pumping beam in order to optimize the performance of the laser pumped laser oscillator.

Extension of the Calculations to Resonator Optimization

The effect upon a resonator beam propagating through this strongly lensing medium will be similarly profound and the confined and perturbation stable gaussian eigenwaves which describe the behavior of the resonator beam of the pumped laser oscillator can not be found (nor can the laser performance be optimized) without including the effects described in the previous sections.

If the thermal lensing characteristics were not important then the optimum focussing parameters of the pumping beam would be mainly determined by the requirement of achieving the best average overlap of the pumping beam and the resonator beam over the longest possible propagation distance. The values of the optimum preset focussing parameters (such as astigmatism, spot size, etc.) for the pumping beam can be determined by calculating the saturated gain for various conditions (including effects of stimulated emission) and maximizing with respect to these parameters. In this calculation it is important to take into account the fact that one is sometimes interested in the best average overlap of two astigmatic gaussian like beams over an extended distance. In the case of a thin gain jet dye laser one is mainly concerned with best overlap between very thin slices of the pump and resonator beam profiles at some point in space (usually the resonator waist location). In that case the beam parameters (such as diameter) do not vary appreciably over the range of interaction within the very thin (often 100-200 micron) gain medium. However, in the case of relatively low absorption gain media such as titanium sapphire the interaction length is much longer and can typically be in the range of 2 cm. In this case the pump beam and resonator beam transverse radii do change appreciably over the range of interaction and moreover, since they are typically at quite different wavelengths their divergence properties are quite different. A problem of this sort is best handled by computer assisted numerical integration techniques which explicitly include propagation effects (divergence and changing diameter) of the pump and resonator beams. This can be done by inclusion of the appropriate rate equations describing the dynamical behavior of the interacting pumped gain medium and the resonator photon field and calculating the integrated gain as the beams propagate into the crystal. This can be done explicitly for the case of astigmatic beams as known in the prior art cited above.

Figure 5:
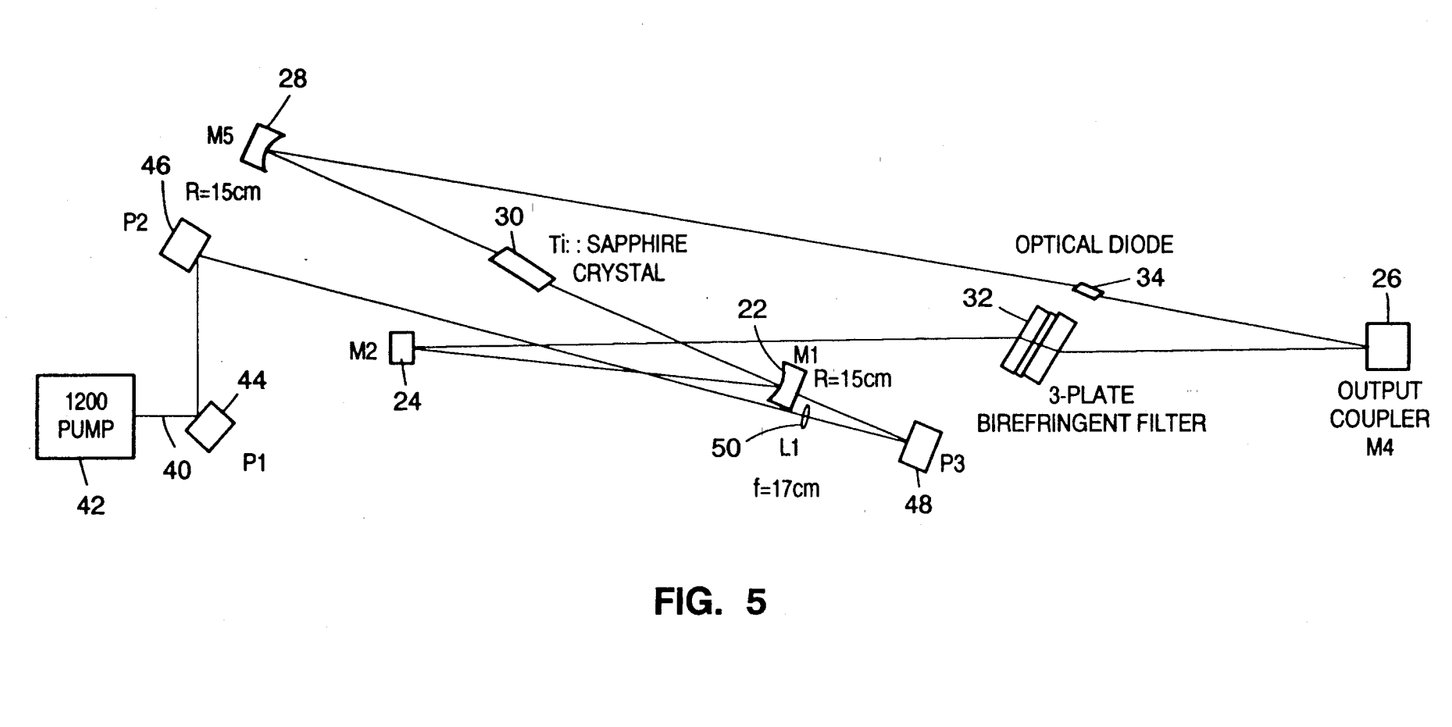
FIG. 5 is a schematic lay-out of a longitudinally laser pumped, titanium sapphire ring laser.

FIG. 5 is a schematic diagram showing the layout of a longitudinally pumped laser 20 incorporating the subject invention. The laser includes a resonant cavity formed in a folded ring configuration. The ring is defined by mirrors 22, 24, 26 and 28. Mirror 26 functions as the output coupler. Mirrors 24 and 26 have flat surfaces. Mirrors 22 and 28 are concave and provide focusing of the cavity beam into the gain medium 30. As noted above, the off-axis focusing mirrors create astigmatism in the cavity beam.

Gain medium 30 is defined by a Ti:Sapphire crystal. The end faces of the crystal are provided with Brewster angle interfaces to minimize transmission losses. The ring also includes a birefringent filter 32 to provide wavelength tuning. Preferably, an optical diode 34 is also provided to insure unidirectional operation of the ring. The optical diode can be defined by a combination of an SF56 glass rhomb and a crystalline quartz rotator plate. It should be understood that the subject invention is not limited to a laser having a ring geometry but is equally applicable to a linear cavity or a laser where the gain medium is end pumped without Brewster angle faces.

In accordance with the subject invention, the gain medium 30 is longitudinally pumped by the beam 40 from another laser 42. The pump laser is defined by an argon ion laser. A suitable pump laser is the Model I200 manufactured by Coherent, Inc. The pump beam is directed into the cavity by three plane mirrors 44, 46 and 48. The beam enters the cavity through mirror 22. Mirror 22 is coated in a manner to transmit the wavelength of the pump beam and reflect the wavelength of the cavity beam.

The pump beam is focused into the cavity by lens 50. The parameters of the lens are selected to maximize the overlap between the pump beam and the cavity beam in the gain medium. These parameters include the focal length, position and the tilt angle of the lens. In the illustrated embodiment, the focal length of the lens is 16.8 cm and the distance to the rear of mirror 22 is 98 mm, the thickness of mirror 22 is 9.3 mm and the spacing between mirror 22 and the face of crystal 30 is 79 mm.

As noted above, in the prior art, the tilt angle of lens 50 was calculated without considering the thermal lens effects created in the gain medium due to the absorption of the pump beam in the gain medium. In contrast, in the subject invention, the thermal lens effects are considered and a significantly different tilt angle will be selected.

Figure 6:
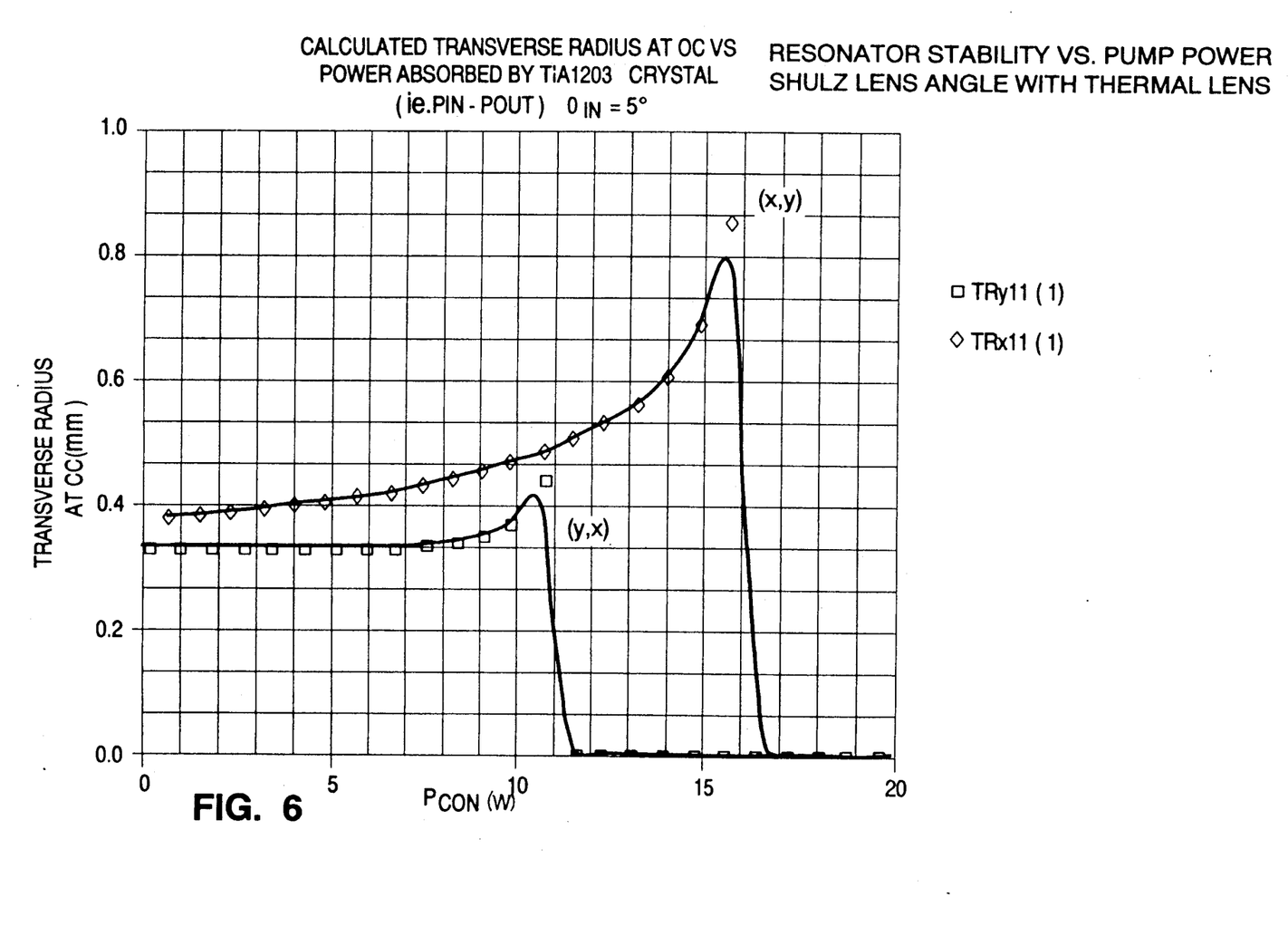
FIG. 6 is a graph illustrating the behavior of the transverse radius of the resonate beam at the output coupler in a laser of the type shown in FIG. 5, optimized in accordance with the teachings of the prior art, without considering thermal lens effects in the gain medium.

FIG. 6 shows an example of some of the properties of an optical resonator that would result if it were designed in accordance with the prior art and failed to account for thermal lensing or laser cooling. In this calculation the laser pumped laser oscillator is a titanium sapphire ring laser of the type shown in FIG. 5. FIG. 6 shows an example of the behavior of the transverse radius of the resonator beam at the output coupler (a measure of the output beam astigmatism) of the ring laser when the pumping beam parameters are optimized according to the prior art criteria of best average overlap of the pumping beam and the resonator beam over the longest possible propagation distance. In this case of a pump beam focussing lens with focal length 16.8 cm the optimum overlap of the astigmatic beams would be achieved by tilting the spherical focussing lens at an angle of incidence of approximately 5 degrees. This best overlap also dictates the proper distance that the focusing lens should be placed from the titanium sapphire crystal. The transverse radius of the ring resonator beam at the output coupler is shown as a function of the power deposited into the gain medium using the subject technique for calculating $f_x'$ and $f_y'$. The radius in the XZ plane can be seen to increase from 0.38 mm to 0.87 mm as the power deposited is increased. At $P_{con}=15.7$ W the resonator can be seen to become optically unstable in the XZ plane and the beam diameter diverges rapidly to infinity at this pumping level. The behavior for the YZ plane is even worse. In this case the transverse radius begins at 0.33 mm and increases to 0.43 mm where the resonator becomes optically unstable at a relatively low input power corresponding to $P_{con}=10.8$ W. Again, at this pump level the beam diameter diverges rapidly to infinity and the laser will not operate in its lowest order TEM mode under these conditions. If thermal lensing were not included in this calculation the transverse radius in the both planes would have remained constant as a function of pumping power and would not have shown the increase in beam radius to the point of instability at all. Practically this means that a laser designed by the average overlap criteria alone will be limited to relatively low input powers compared to a laser design which includes and compensates for thermal lensing effects.

Figure 7A:
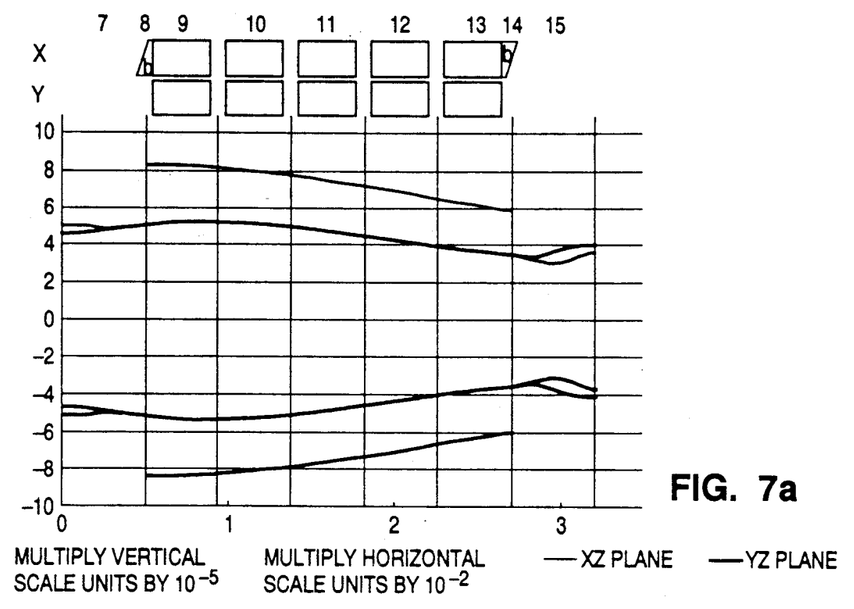
FIG. 7a is a graph showing the transverse radius of the pumping beam when the focusing optic is tilted at 5°.
Figure 7B:
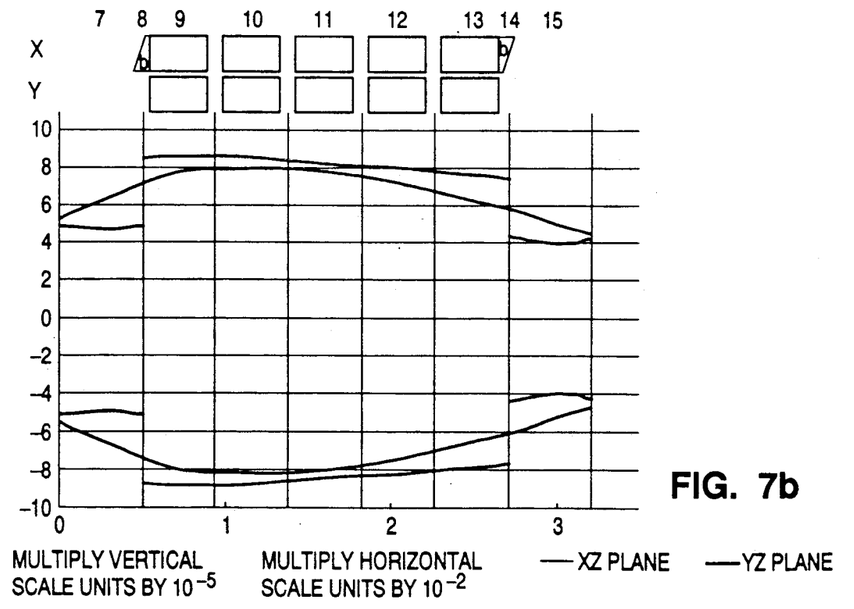
FIG. 7b is a graph, similar to FIG. 7a, wherein the focusing optic is tilted at 10°.

In the case of the laser described in this example the useful range of pumping power (and output power) can be increased considerably by weakening the thermal lens in the YZ plane. One way of accomplishing this is to tilt the input lens by a much larger angle until the resonator becomes optically stable at higher input powers. FIG. 7a shows the transverse radius of the pumping beam inside the titanium sapphire crystal when the incident angle to the tilted lens is equal to 5 degrees. If the incident angle is increased to 10 degrees as shown in FIG. 7b one can see that the XZ beam diameter remains unchanged compared to the 5 degree case. In contrast however the guided YZ beam is considerably enlarged and reaches a maximum radius of 80 microns for a 10 degree tilt compared to 52 microns for the 5 degree tilt.

For this calculation example the distance of the focussing lens to the crystal has been adjusted such that the waist in the XZ plane occurs at the input face of the crystal. In general, the maximum achievable gain will be obtained if this distance is slightly different. The proper distance is calculable using the numerical integration techniques described above in conjunction with a full proper description of the beam propagations in the case of strongly lensing media.

Figure 8:
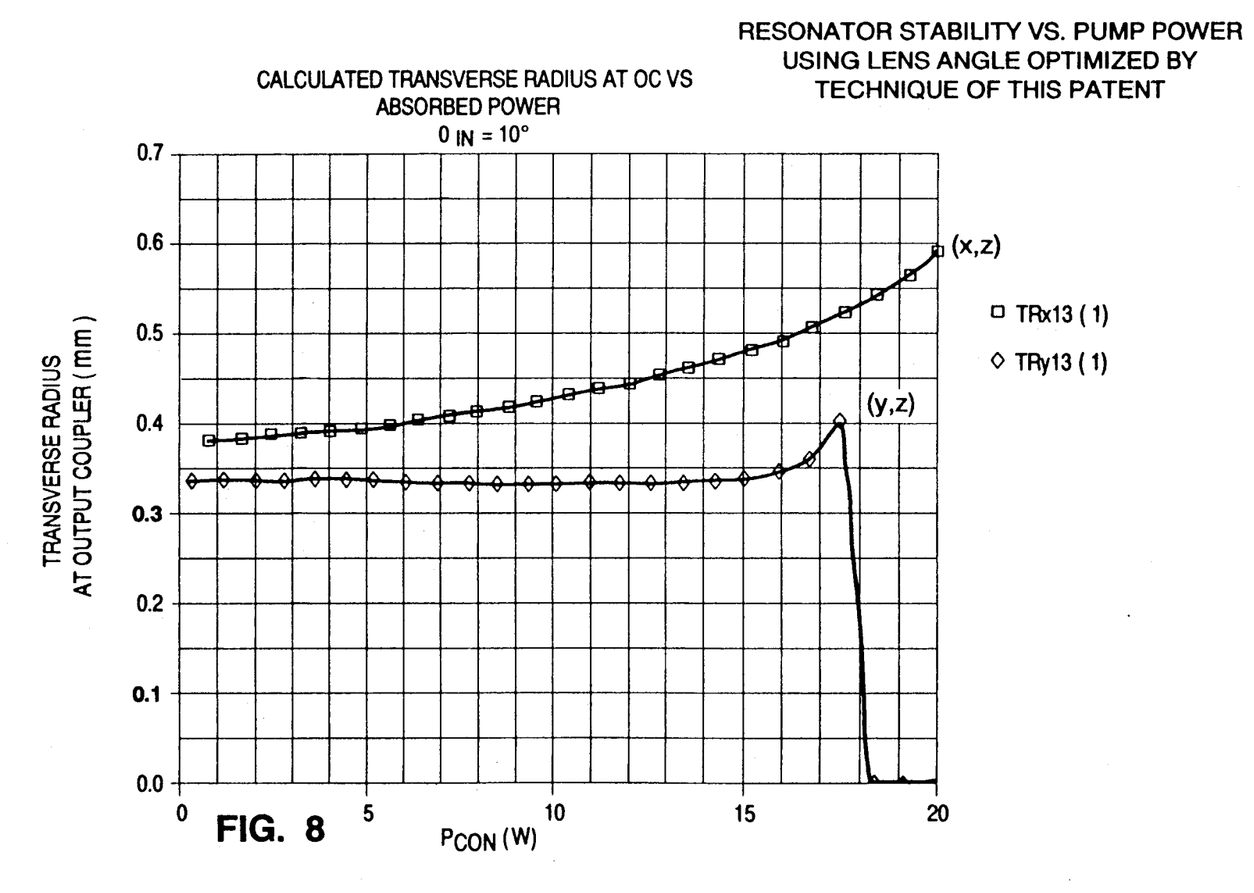
FIG. 8 is a graph, similar to FIG. 6, where the focusing optic is tilted at 10° to compensate for thermal lens effects in accordance with the subject invention.

If the input focussing lens is tilted to the larger angle (10°) to enlarge the beam diameter in the YZ plane, the resonator behavior as a function of pumping power can be seen to be quite different. FIG. 8 illustrates the calculated transverse radius of the resonator beam at the output coupler vs. $P_{con}$ for the same laser as referenced in FIG. 6. In this case the transverse radius in the XZ plane can be seen to start at 0.38 mm for pump powers near zero and to increase to a value of 0.6 mm at $P_{con}=20$ W remaining optically stable over the entire range. In the YZ plane the range of pumping power can be seen to have been extended by some 60% compared to tilt angle of 5 degrees. The resonator does not become unstable until a pumping level of $P_{con}=17.5$ W is reached compared to 10.8 W for the 5 degree case.

With the implementation of this technique for optimizing the design of the laser pumped laser oscillator significant improvements in thermal stability, output mode quality and output powers over the prior art can be achieved.

I claim:
1. A laser system comprising:
   a resonant cavity;
   a gain medium having a longitudinal axis, said gain medium being located within said resonant cavity;
   a pump laser generating a beam of radiation for exciting said gain medium and creating a cavity beam; and
   focusing means for directing said beam of radiation from said pump laser into said gain medium along said longitudinal axis thereof, with the absorption of the pump beam radiation in the gain medium creating a thermal lens therein and with the focal power of the thermal lens being dependent upon the longitudinal position in the gain medium, said focusing means being configured to modify the shape of the pump beam to match the shape of the cavity beam within the gain medium, with said focusing means having a focal length, angle of incidence and location selected to take into account the varying thermal lens effects created along the longitudinal axis of the gain medium.

2. A laser as recited in claim 1 wherein the focal length, angle of incidence and location of said focusing means is further selected to take into account the amount of power of the pump beam which is converted into the power of the cavity beam.

3. A laser as recited in claim 1 wherein said focusing means is a lens.

4. A laser as recited in claim 1 wherein said focusing means is astigmatic.

* * * * *